United States Patent
Li et al.

(10) Patent No.: US 9,386,481 B2
(45) Date of Patent: Jul. 5, 2016

(54) METHOD, APPARATUS AND SYSTEM OF MANAGING AN ENCODER OUTPUT RATE BASED UPON WIRELESS COMMUNICATION LINK FEEDBACK

(75) Inventors: Guoqing Li, Portland, OR (US);
Mikhail S. Tsvetkov, Mytishchi (RU);
Andrey Belogolovy, Saint-Petersburg (RU); Vallabhajosyula S. Somayazulu, Portland, OR (US); Lei Shen, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 653 days.

(21) Appl. No.: 13/514,574

(22) PCT Filed: Dec. 24, 2009

(86) PCT No.: PCT/CN2009/001542
§ 371 (c)(1),
(2), (4) Date: Aug. 9, 2012

(87) PCT Pub. No.: WO2011/075869
PCT Pub. Date: Jun. 30, 2011

(65) Prior Publication Data
US 2012/0300645 A1  Nov. 29, 2012

(51) Int. Cl.
*H04W 28/16* (2009.01)
*H04L 1/00* (2006.01)
(Continued)

(52) U.S. Cl.
CPC .............. *H04W 28/16* (2013.01); *H04L 1/0009* (2013.01); *H04L 1/0014* (2013.01); *H04L 41/12* (2013.01); *H04L 43/0811* (2013.01); *H04L 45/42* (2013.01); *H04W 28/10* (2013.01)

(58) Field of Classification Search
CPC ...................................... H04L 1/0009
USPC .......... 370/248, 254, 329, 328, 331, 412, 446
See application file for complete search history.

(56) References Cited

U.S. PATENT DOCUMENTS 6,272,121 B1 * 8/2001 Smith et al. ................... 370/342
7,719,991 B2 * 5/2010 Bhushan ............... H04L 1/0025
370/232

(Continued)

FOREIGN PATENT DOCUMENTS

CN          1363193 A     8/2002
CN          1592438 A     3/2005
(Continued)

OTHER PUBLICATIONS

International Search Report and Written Opinion Received for PCT Patent Application No. PCT/CN2009/001542, Mailed on Sep. 30, 2010, 7 pages.

(Continued)

*Primary Examiner* — Andrew C Lee
(74) *Attorney, Agent, or Firm* — Shichrur & Co.

(57) ABSTRACT

Machine-readable media, methods, apparatus and system for managing an encoder output rate at least partially based upon wireless communication link feedback are described. In some embodiments, a device driver of the system may generate link information indicating quality of a wireless communication link between the system and another system, wherein the link information is generated at least partially based upon at least one of media access layer (MAC) information and physical layer information of the system. A system managing entity of the system may manage an output rate of an encoder of the system at least partially based upon the link information.

22 Claims, 4 Drawing Sheets

(51) Int. Cl.
*H04L 12/717* (2013.01)
*H04L 12/24* (2006.01)
*H04L 12/26* (2006.01)
*H04W 28/10* (2009.01)

(56) References Cited

U.S. PATENT DOCUMENTS

| | | | | |
|---|---|---|---|---|
| 7,860,992 | B2* | 12/2010 | Robinson | H04L 47/10 370/412 |
| 8,144,670 | B2* | 3/2012 | Shin | H04W 72/0406 370/229 |
| 8,717,979 | B2* | 5/2014 | Tsai | H04J 4/00 370/329 |
| 2002/0054578 | A1* | 5/2002 | Zhang | H04L 1/0001 370/328 |
| 2002/0078247 | A1* | 6/2002 | Lu et al. | 709/251 |
| 2003/0152058 | A1* | 8/2003 | Cimini, Jr. | H04L 47/10 370/338 |
| 2004/0049570 | A1* | 3/2004 | Frank | G01S 5/0252 709/223 |
| 2004/0233855 | A1* | 11/2004 | Gutierrez et al. | 370/252 |
| 2005/0025182 | A1* | 2/2005 | Nazari | H04W 88/06 370/469 |
| 2005/0135295 | A1* | 6/2005 | Walton et al. | 370/328 |
| 2006/0023684 | A1* | 2/2006 | Seo | H04W 74/02 370/338 |
| 2006/0039346 | A1* | 2/2006 | Shapiro | 370/349 |
| 2006/0040645 | A1* | 2/2006 | Grilli et al. | 455/412.1 |
| 2006/0104370 | A1 | 5/2006 | Yamanaka et al. | |
| 2006/0114836 | A1* | 6/2006 | Pollin | H04L 1/24 370/252 |
| 2006/0198341 | A1* | 9/2006 | Singh et al. | 370/331 |
| 2006/0215626 | A1* | 9/2006 | Ross | H04B 7/2621 370/344 |
| 2006/0265474 | A1* | 11/2006 | Kim et al. | 709/218 |
| 2007/0110055 | A1* | 5/2007 | Fischer et al. | 370/389 |
| 2007/0153916 | A1* | 7/2007 | Demircin | H04N 21/2365 375/240.26 |
| 2008/0022181 | A1* | 1/2008 | Belogolovy et al. | 714/751 |
| 2008/0280631 | A1* | 11/2008 | Lee | H04W 48/12 455/458 |
| 2009/0034610 | A1 | 2/2009 | Lee et al. | |
| 2009/0086657 | A1* | 4/2009 | Alpert | H04L 1/1838 370/310 |
| 2009/0122765 | A1* | 5/2009 | Dimou et al. | 370/336 |
| 2009/0147766 | A1* | 6/2009 | Chamberlain | H04L 1/0002 370/347 |
| 2009/0196363 | A1* | 8/2009 | Suda et al. | 375/260 |
| 2009/0262753 | A1* | 10/2009 | On et al. | 370/466 |
| 2009/0287816 | A1* | 11/2009 | Matta et al. | 709/224 |
| 2010/0002590 | A1* | 1/2010 | Park | H04W 74/006 370/241 |
| 2010/0034141 | A1* | 2/2010 | Meylan | H04W 74/0833 370/328 |
| 2010/0040028 | A1* | 2/2010 | Maheshwari | H04W 74/02 370/336 |
| 2010/0041428 | A1* | 2/2010 | Chen | H04W 52/16 455/522 |
| 2010/0130138 | A1* | 5/2010 | Nandagopalan et al. | 455/69 |
| 2011/0051642 | A1* | 3/2011 | Krishnaswamy | H04W 40/10 370/311 |

FOREIGN PATENT DOCUMENTS

| | | |
|---|---|---|
| CN | 101019459 A | 8/2007 |
| CN | 101455086 A | 6/2009 |
| JP | 11069349 | 3/1999 |
| JP | 2004343726 | 12/2004 |
| JP | 2005184662 | 7/2005 |
| JP | 2007194706 | 8/2007 |
| JP | 2008311831 | 12/2008 |

OTHER PUBLICATIONS

International Preliminary Report on Patentability Received for PCT Patent Application No. PCT/CN2009/001542, Issued on Jul. 5, 2012, 6 pages.
Office Action for Japanese Patent Application No. 2012-545041, mailed on Feb. 25, 2014, 4 pages, including 2 English translation.
Office Action for Chinese Patent Application No. 200980163086.7, mailed on Apr. 2, 2014, 21 pages, including 13 pages of English translation.
Office Action for Japanese Patent Application No. 2012-545041, mailed on Jul. 16, 2013, 4 pages, including 2 pages of English translation.
European Communication Pursuant to Rules 161(2) and 162 EPC for European Patent Application No. 09852419.2 Mailed Jul. 31, 2012, 2 Pages.
Office Action for Chinese Patent Application No. 200980163086.7, mailed on Sep. 23, 2014, 15 pages, including 9 pages of English translation.
Office Action from European Patent Application No. 09852419.2, mailed on Aug. 20, 2015, 4 pages.
Extended Search Report from European Patent Application No. 09852419.2, mailed on Dec. 16, 2014, 7 pages.
Office Action for Chinese Patent Application No. 200980163086.7, mailed on Mar. 10, 2015, 15 pages, including 9 pages of English translation.
Notice of Reexamination for Chinese Patent Application No. 200980163086.7, mailed on Dec. 9, 2015, 25 pages (Including 16 pages of English translation).
Office Action for European Patent Application Serial No. 09 852 419.2, mailed on Mar. 24, 2016, 5 pages.
Notice of Reexamination for Chinese Patent Application No. 200980163086.7, mailed on Apr. 27, 2016, 26 pages (Including 16 pages of English translation).

* cited by examiner

METHOD, APPARATUS AND SYSTEM OF MANAGING AN ENCODER OUTPUT RATE BASED UPON WIRELESS COMMUNICATION LINK FEEDBACK

CLAIM OF PRIORITY

This application is a U.S. National Phase application under 35 U.S.C. §371 of International Patent Application No. PCT/CN2009/001542, filed Dec. 24, 2009, entitled "METHOD, APPARATUS AND SYSTEM OF MANAGING AN ENCODER OUTPUT RATE BASED UPON WIRELESS COMMUNICATION LINK FEEDBACK", the entire contents of which are incorporated herein by reference.

BACKGROUND

High speed wireless communication, such as 60 GHz wireless communication technology according to Wireless Gigabits Alliance, may be widely used for short-range wireless transmissions in many multimedia applications that may require transmission of a huge amount of data in a short distance within a few seconds, such as high-definition digital video transferred between a computer and monitors, or between a set-top box and high-definition televisions.

Due to the high speed transmission, when the high speed link (e.g., 60 GHz link) is severely degrading and/or to be broken, a significant amount of data may need to be buffered at a transmitting station, while a receiving station may wait to receive the data to be displayed.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for managing an encoder output rate at least partially based upon wireless communication link feedback. In the following description, numerous specific details such as logic implementations, pseudo-code, methods to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
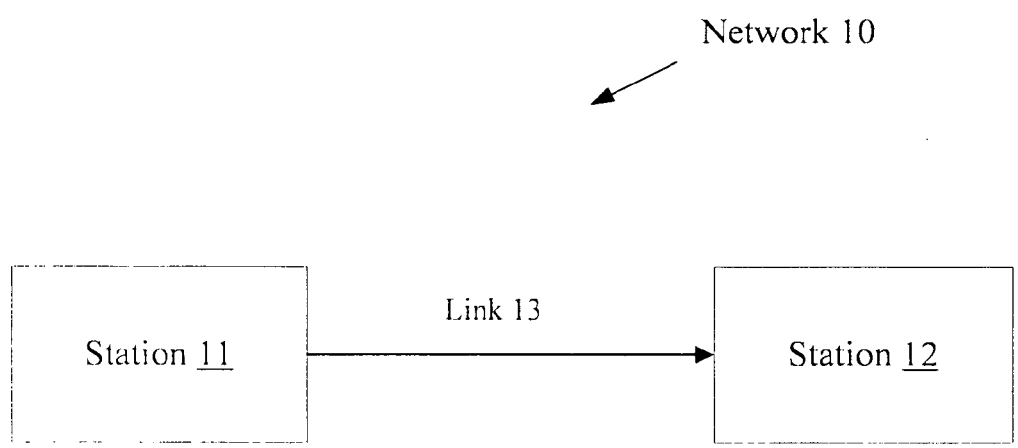
FIG. 1 illustrates an embodiment of a network transmitting data via a high speed wireless communication link.

FIG. 1 illustrates an embodiment of a network communicating data via a high speed wireless communication link. As illustrated, network 10 may comprise a station 11 transmitting/receiving data from/to another station 12 via a high speed wireless communication link 13, e.g., 60 GHz wireless communication link according to Wireless Gigabits Alliance.

Examples of stations 11 and 12 may comprise computer, set-top box, digital video disc (DVD) player, video compact disc (VCD) player, compact disc (CD) player, hand-held device, monitor and other devices for transceiving and processing data. Herein, "transceiving" may comprise sending and/or receiving. For example, station 11 (e.g., a DVD player) may transmit video data to station 12 (e.g., a monitor) via the 60 GHz wireless communication link, and vise versa.

Figure 2:
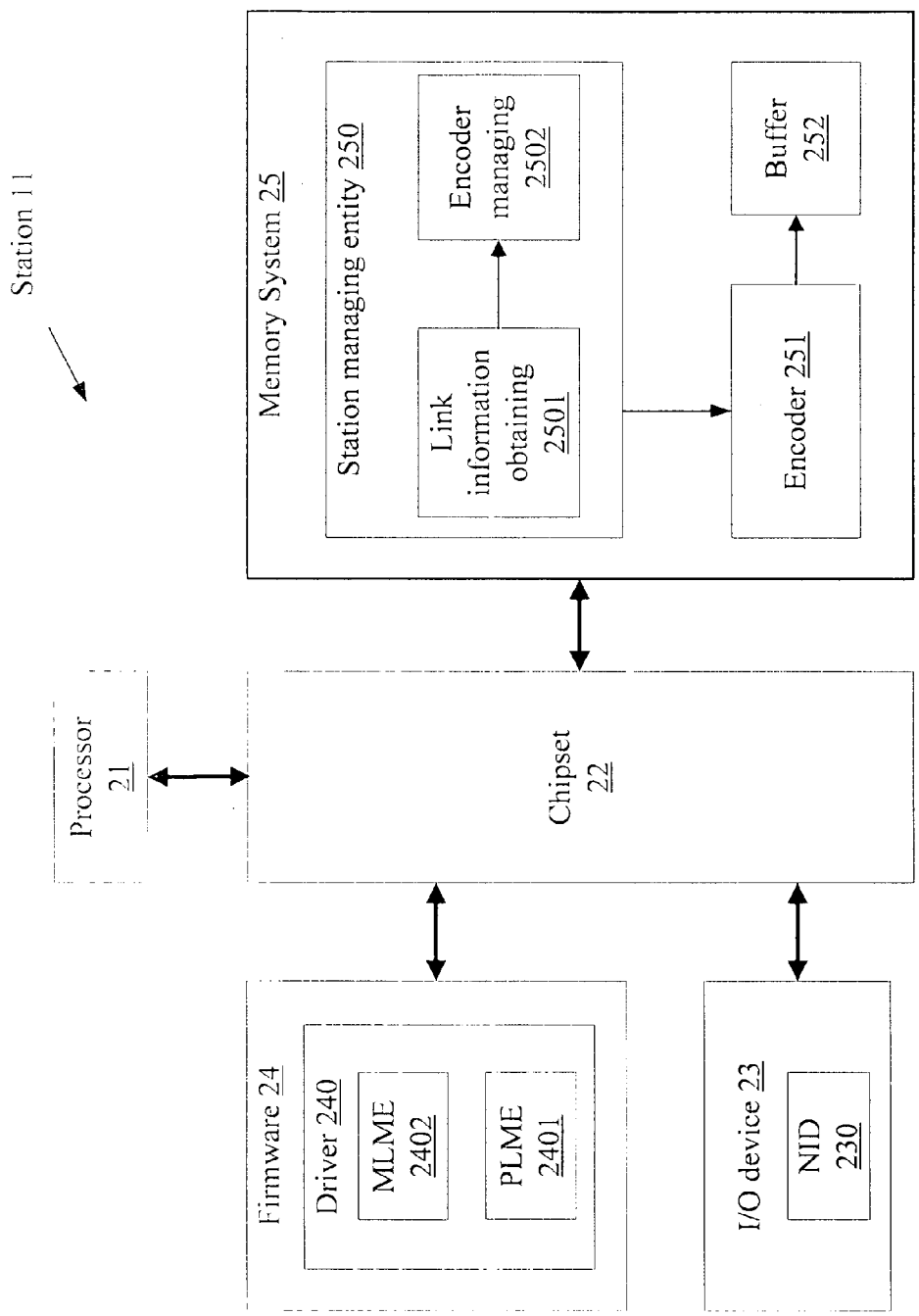
FIG. 2 illustrates an embodiment of a station in the network of FIG. 1.

FIG. 2 illustrates an embodiment of station 11 in the network of FIG. 1. It should be appreciated that the same scenario may be applied to station 12 in the network of FIG. 1.

In the embodiment, station 11 may comprise one or more processor 21, chipset 22, I/O device 23, firmware 24, memory system 25, and possibly other components. One or more processors 21 may be communicatively coupled to various components (e.g., the chipset 22) via one or more buses such as a processor bus. Processors 21 may be implemented as an integrated circuit (IC) with one or more processing cores that may execute codes under a suitable architecture, for example, including Intel® Xeon™, Intel® Pentium™, Intel® Itanium™, Intel® Core architectures, available from Intel Corporation of Santa Clara, Calif.

Chipset 22 may provide one or more communicative path among processors 21, I/O devices 23, firmware 24, memory 25 and possibly other components. I/O devices 33 may input or output data to or from station 11 via the high speed wireless communication link, such as the 60 GHz wireless communication link according to the Wireless Gigabits Alliance. Examples for I/O devices 34 may comprise a network interface card, video input interface such as HDMI, DVI or DisplayPort and possibly other devices for transceiving data.

Firmware 24 may comprise programs or data structures that internally control various devices of station 11. Firmware 24 may reside in read-only memory (ROM), programmable ROM, flash memory and/or other types of storing devices. In an embodiment, firmware 24 may comprise a device driver 240 to control at least one of I/O device 23, e.g., network interface card (NID) 230 or video capturing module (not shown in FIG. 2). It should be appreciated that device driver 240 may reside in other components of station 11, such as operating system (not shown in FIG. 2). Device driver 240 may enable configuration, initialization and other basic operations of NID 230 as well as implementing higher-level functions. In an embodiment, device driver 240 may comprise a physical layer management entity (PLME) 2401 to manage operations of a physical layer (PHY) over which actual electric pulse transformation of the data travels, and a media access layer (MAC) management entity (MLME) 2402 to manage operations of a MAC layer controlling protocol access to the physical medium, e.g., through a collection of primitives.

In an embodiment, MLME 2402 may generate link information indicating quality of the high speed wireless link (e.g., 60 GHz wireless link). If the data (e.g., video data) is transmitted on the link in form of streams, the link information may indicate quality of the high speed wireless link with regard to per data stream transmitted on the link. It should be appreciated that if the data is transmitted in other forms, the link information may be adapted accordingly.

In an embodiment, the link information may comprise a raw transmission rate over the link, a packet error rate (PER), a link condition parameter and/or other parameters indicating the link quality per data stream. The link condition parameter may indicate how much the link is degraded. For example, the link condition parameter may be a link broken possibility.

MLME 2402 may generate the link information at least partially based upon MAC layer and/or PHY layer information. In an embodiment, MLME 2402 may track the raw transmission rate over the physical layer, for example, available throughput over the link, through communicating with PLME 2401. MLME 2402 may further calculate the PER by tracking successful transmissions vs. unsuccessful transmissions, for example, with use of acknowledgement (ACK) and non-acknowledgement (NACK) information from station 12. MLME 2402 may further track signal to noise rate (SNR) at the physical layer for a number of time periods and generate the link condition parameter based on the SNRs. In an embodiment, the longer and/or the faster the SNR degrades (e.g., the SNR is lower than a predetermined threshold), the higher possibility the link condition is going to be broken.

Memory 25 may store instructions and data to be executed by the processor 31. Examples for memory 32 may comprise one or any combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

In an embodiment, memory 25 may store instructions and data functioning as a station management entity (SME) 250 to manage a rate at which an encoder 251 outputs encoded data (e.g., video data) to a buffer 252. It should be appreciated that station management entity 250, encoder 251, and/or buffer 252 may be implemented with other technologies, such as implemented with digital/analog circuits.

SME 250 may comprise link information obtaining logic 2501 and encoder managing logic 2502. Link information obtaining logic 2501 may obtain the link information related to the quality of the high speed wireless communication link (e.g., 60 GHz wireless link). In an embodiment, the link information may be generated at least partially based upon the MAC layer and/or PHY layer information. In another embodiment, the link information may indicate the link quality with regard to per data stream transmitted on the link.

SME 250 may obtain the link information from MLME 2402. In an embodiment, MLME 2402 may send the link information to SME 250 upon a request from SME 250. In another embodiment, MLME 2402 may send the link information if the link information shows the link is in a critical condition, for example, if the link is severely degraded and/or almost broken. It should be appreciated that "critical condition" may be determined in other ways.

In an embodiment, link information may comprise the raw transmission rate over the link, packet error rate, link condition parameter and/or other parameters indicating the link quality per data stream.

Encoder managing logic 2502 may manage the rate at which encoder 251 outputs the encoded data to buffer 252 at least partially based upon the link information obtained from MLME 2402. Encoder managing logic 2502 may determine whether the link information indicates that the link is in the critical condition. In an embodiment, encoder manager logic 2502 may determine that the link is in a critical condition if the link condition parameter (e.g., link broken possibility) is over a predetermined threshold and vice versa.

If the link is determined to be in a non-critical condition, encoder managing logic 2502 may keep the encoder output rate matching with a transmission rate that station 11 transmits the encoded data to station 12. In an embodiment, the transmission rate may include at least one of the raw transmission rate equal to the available throughput at which station 11 successfully or unsuccessfully transmits the encoded data to station 12, and an effective transmission rate at which station 11 successfully transmits the encoded data to station 12. In an embodiment, the effective transmission rate may be calculated with the following equation:

$$\text{Effective transmission rate} = \text{Raw transmission rate (or available output)} * (1 - \text{PER})$$

If the link is determined to be in the critical condition, encoder managing logic 2502 may adjust the encoder output rate lower than the rate that station 11 transmits the encoded data on the link. In this way, buffer 252 space may be preserved for the incoming link degradation, which may cause more data stuck in buffer 252. In an embodiment, the encoder output rate may be reduced according to the following formula:

$$\text{Encoder output rate} = \text{Transmission rate}/N$$

Wherein, N may be configurable at least partially based upon a link broken possibility and predicated time to link broken.

Different embodiments may apply different technologies to adjust the encoder output rate. In another embodiment, the encoder output rate may be lowered through increasing an encoder compression rate, dropping a part of the data, subsampling a color space (for video data), and possible other ways, and vice versa. To increase the encoder compression rate and/or to sub-sample the color space may help to transmit more data with the limited bandwidth so that station 12 may receive and buffer the highly compressed data for displaying during the link degrading period.

Figure 3:
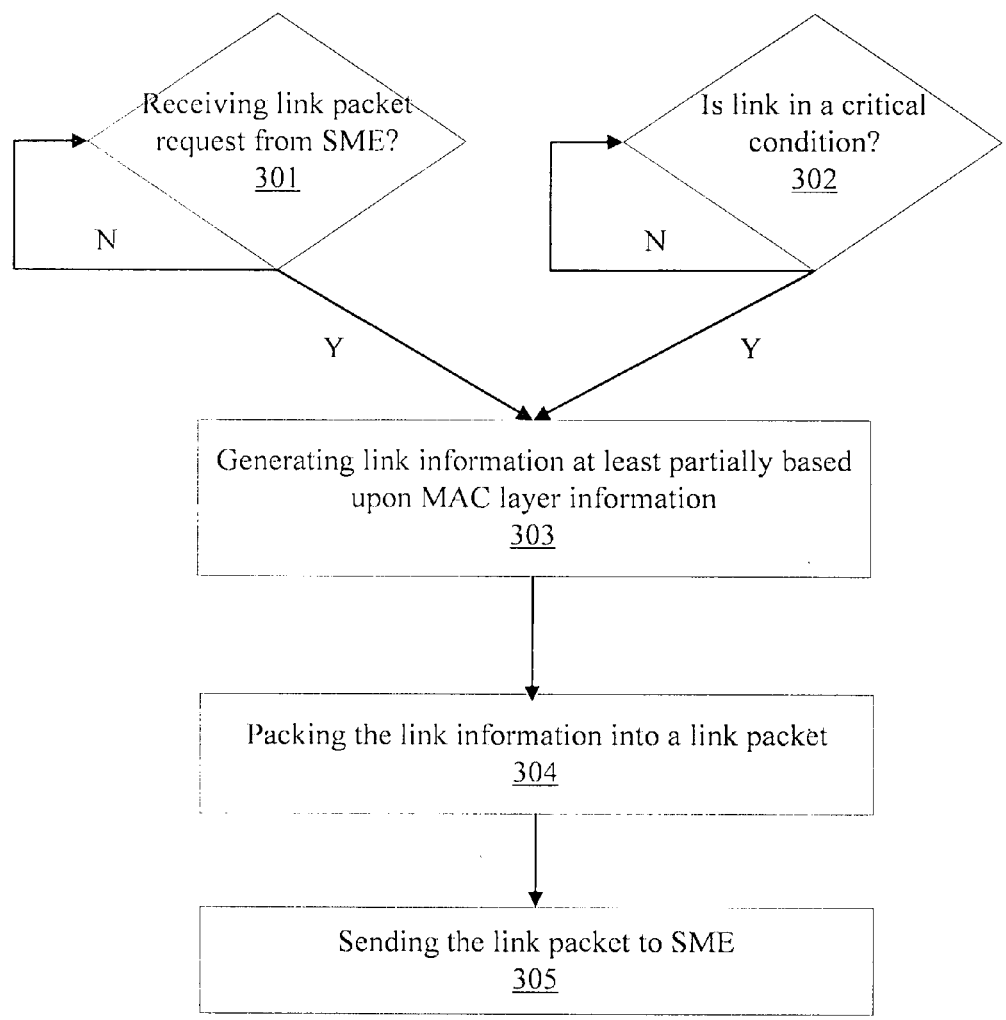
FIG. 3 illustrates an embodiment of a method of generating a link packet containing quality feedback of the wireless communication link.

FIG. 3 illustrates a method of generating a link packet containing quality feedback of the wireless communication link. MLME 2402 or other device may generate a link packet having link information indicating quality of the high speed wireless communication link (e.g., 60 GHz wireless link according to the Wireless Gigabit Alliance). In an embodiment, the link information may be generated at least partially based upon MAC layer and/or PHY layer information. In another embodiment, the link information may indicate the quality of the high speed link per data stream transmitted over the link from station 11 to station 12.

Different embodiments may apply different technologies to stimulate MLME 2402 to generate the link packet. In an embodiment, MLME 2402 or other device may generate the link packet upon receiving a link packet request from SME 250 (block 301). In another embodiment, MLME 2402 or other device may generate the link packet if the link is in a critical condition (block 302), for example, the link is severely degraded and/or almost broken. For example, MLME 2402 or other device may track SNRs over the link, and if the SNRs are lower than a predetermined threshold for a period of time, MLME 2402 or other device may determine that the link is in the critical condition.

In block 303, MLME 2402 or other device may generate the link information indicating the quality of the high speed wireless link. In an embodiment, the link information may comprise the raw transmission rate over the link, packet error rate (PER), link condition parameter and/or other parameters indicating the link quality, e.g., the link quality per data stream. The link condition parameter may indicate how much the link is degraded. For example, the link condition parameter may be a link broken possibility.

Many technologies may be applied for MLME 2402 or other device to generate the link information. In an embodiment, MLME 2402 or other device may track the raw transmission rate over the physical layer, e.g., available throughput over the link, through communicating with PLME 2401. MLME 2402 or other device may further calculate the PER by tracking successful transmission vs. unsuccessful transmission, for example, via acknowledgement (ACK) and non-acknowledgement (NACK) from station 12. MLME 2402 or other device may track signal to noise rate (SNR) at the physical layer for a number of time periods and generate the link condition parameter based on the SNRs. In an embodiment, the longer and/or the faster the SNR degrades (e.g., the SNR is lower than a predetermined threshold), the higher possibility that the link condition is going to be broken.

Then, MLME 2402 or other device may pack the link information into a link packet in block 304 and send the link packet to SME 250 in block 305.

Figure 4:
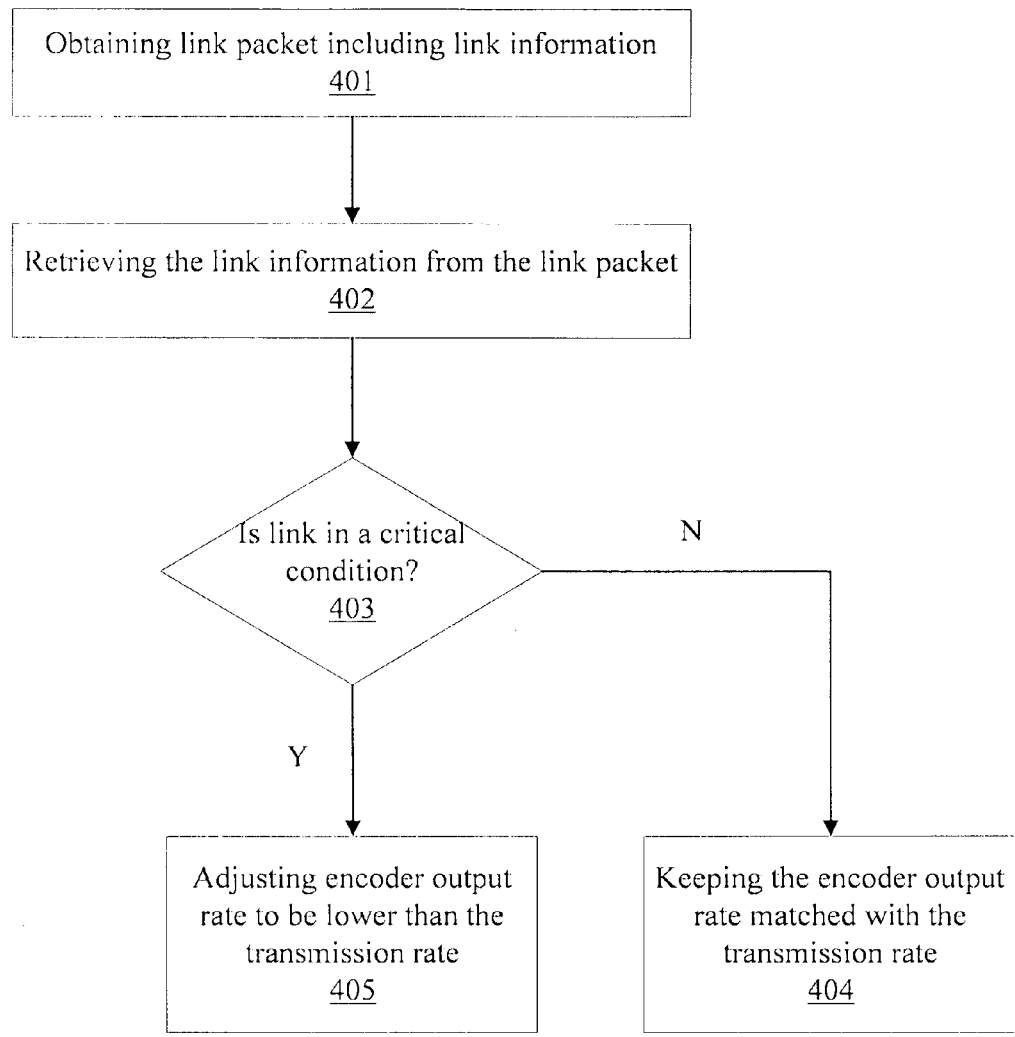
FIG. 4 illustrates an embodiment of a method of managing an encoder output rate at least partially based upon the link packet.

FIG. 4 illustrates a method of managing an encoder output rate at least partially based upon the link packet. In block 401, SME 250 or other device may obtain the link packet having the link information from MLME 2402, either through requesting MLME 2402 of the link packet or through receiving the link packet initiatively sent by MLME 2402. In block 402, SME 250 or other device may retrieve the link information from the link packet, e.g., the raw transmission rate, PER, and link quality parameter.

In block 403, SME 250 or other device may determine if the link is in the critical condition, for example, whether the link is severely degrading and/or whether the link is to be broken. In an embodiment, SME 250 or other device may make the determination at least partially based upon the link quality parameter. Taking the link quality parameter is a link broken possibility as an example, SME 250 or other device may determine the link is in the critical condition if the link broken possibility is higher than a predetermined threshold and vice versa.

In response that the link is not in the critical condition, in block 404, SME 250 or other device may keep the encoder output rate matched with the transmission rate. In an embodiment, the transmission rate may include at least one of the raw transmission rate equal to the available throughput at which station 11 successfully or unsuccessfully transmits the encoded data to station 12, and the effective transmission rate at which station 11 successfully transmit the encoded data to station 12. In an embodiment, the effective transmission rate may be calculated with the following equation:

$$\text{Effective transmission rate} = \text{Raw transmission rate (or available output)} * (1-\text{PER})$$

In response that the link is in the critical condition, in block 405, SME 250 or other device may adjust the encoder output rate to be lower than the transmission rate. Different embodiments may apply different technologies to adjust the encoder output rate. In an embodiment, the encoder output rate may be lowered through increasing an encoder compression rate, dropping a part of the data, sub-sampling a color space (for video data), and possible other ways, and vice versa. To increase the encoder compression rate and/or to sub-sample the color space may help to transmit more data with the limited bandwidth so that station 12 may receive and buffer the highly compressed data for displaying during the link degrading period.

Although the present invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
obtaining link information indicating quality of a wireless communication link between a system and another system, wherein the link information is at least partially based upon at least one type of information selected from a group consisting of media access control (MAC) layer information and physical layer information of the system; and
managing an output rate of an encoder of the system at least partially based upon the link information, wherein the managing comprises, when the link information indicates that the quality of the wireless communication link is not in a critical condition, matching the output rate of the encoder with a transmission rate at which the system transmits data to the another system on the wireless communication link, and, when the link information indicates that the quality of the wireless communication link is in the critical condition, reducing the output rate of the encoder to be lower than the transmission rate at which the system transmits data to the another system on the wireless communication link.

2. The method of claim 1, wherein the link information is at least partially based upon per stream of data transmitted from the system to the another system on the wireless communication link.

3. The method of claim 1, wherein the link information is obtained through requesting and receiving the link information from a MAC layer management entity of the system.

4. The method of claim 1, wherein the link information is obtained through receiving the link information initiatively sent from a MAC layer management entity of the system.

5. The method of claim 1, wherein the link information includes at least one parameter selected from a group consisting of the transmission rate, a packet error rate, and a link condition parameter, and wherein the link condition parameter indicates a possibility that the wireless communication link is in the critical condition.

6. A non-transitory storage medium having stored thereon instructions that, when executed by a machine, result in a device driver, the device driver comprising:
a media access control (MAC) layer management entity to generate link information indicating quality of a wireless communication link between the system and another system, wherein the link information is generated at least partially based upon at least one type of information selected from a group consisting of MAC layer information and physical layer information of the system, and wherein the link information is configured to allow managing an output rate of an encoder of the system, relative to a transmission rate at which the system transmits data to the another system on the wireless communication link, based on whether or not the link information indicates that the quality of the wireless communication link is in a critical condition.

7. The non-transitory storage medium of claim 6, wherein the link information is generated at least partially based upon per stream of data transmitted from the system to the another system on the wireless communication link.

8. The non-transitory storage medium of claim 6, wherein the link information includes at least one parameter selected from a group consisting of the transmission rate, a packet error rate, and a link condition parameter.

9. The non-transitory storage medium of claim 6, wherein the MAC layer management entity is to generate the link information through tracking the transmission rate on the wireless communication link between the system and the another system.

10. The non-transitory storage medium of claim 6, wherein the MAC layer management entity is to generate the link information through monitoring signal to noise rates (SNRs) over a time period, and calculating a link condition parameter at least partially based upon the SNRs, wherein the link condition parameter indicates a possibility that the wireless communication link is in the critical condition.

11. The non-transitory storage medium of claim 6, wherein the MAC layer management entity is to generate the link information upon a request from an apparatus of the system which manages the output rate of the encoder.

12. The non-transitory storage medium of claim 6, wherein the MAC layer management entity is to generate the link information when the wireless communication link is in the critical condition.

13. A system, comprising:
a transceiver to transceive data via a wireless communication link between the system and another system;
a chipset;
a device driver to generate link information indicating quality of said wireless communication link, wherein the link information is at least partially based upon at least one type of information selected from a group consisting of media access control (MAC) layer information and physical layer information of the system; and
a station management entity to manage an output rate of an encoder of the system at least partially based upon the link information, wherein said station management entity is to, when the link information indicates that the quality of the wireless communication link is not in a critical condition, match the output rate of the encoder with a transmission rate at which the system transmits data to the another system on the wireless communication link, said station management entity is to, when the link information indicates that the quality of the wireless communication link is in the critical condition, reduce the output rate of the encoder to be lower than the transmission rate at which the system transmits data to the another system on the wireless communication link.

14. The system of claim 13, wherein the link information is at least partially based on per stream of data transmitted from the system to the another system on the wireless communication link.

15. The system of claim 13, wherein the link information comprises at least one parameter selected from a group consisting of the transmission rate, a packet error rate, and a link condition parameter.

16. The system of claim 13, wherein the device driver is to send the link information to the station management entity, upon a request from the station management entity.

17. The system of claim 13, wherein the device driver is to send the link information to the station management entity when the wireless communication link is in the critical condition.

18. A non-transitory storage medium having stored thereon instructions that, when executed by a machine, result in:
obtaining link information indicating quality of a wireless communication link between a system and another system, wherein the link information is at least partially based upon at least one type of information selected from a group consisting of media access control (MAC) layer information and physical layer information of the system; and
managing an output rate of an encoder of the system at least partially based upon the link information, wherein the managing comprises, when the link information indicates that the quality of the wireless communication link is not in a critical condition, matching the output rate of the encoder with a transmission rate at which the system transmits data to the another system on the wireless communication link, and, when the link information indicates that quality of the wireless communication link is in the critical condition, reducing the output rate of the encoder to be lower than the transmission rate at which the system transmits data to the another system on the wireless communication link.

19. The non-transitory storage medium of claim 18, wherein the link information is at least partially based upon per stream of data transmitted from the system to the another system on the wireless communication link.

20. The non-transitory storage medium of claim 18, wherein the link information is obtained through requesting and receiving the link information from a MAC layer management entity of the system.

21. The non-transitory storage medium of claim 18, wherein the link information is obtained through receiving the link information initiatively sent from a MAC layer management entity of the system.

22. The non-transitory storage medium of claim 18, wherein the link information includes at least one parameter selected from a group consisting of the transmission rate, a packet error rate, and a link condition parameter, and wherein the link condition parameter indicates a possibility that the wireless communication link is in the critical condition.

* * * * *